(12) United States Patent
Peter (10) Patent No.: US 11,366,597 B2
(45) Date of Patent: Jun. 21, 2022

(54) STORAGE SYSTEM AND METHOD FOR MAINTAINING UNIFORM HOT COUNT DISTRIBUTION USING SMART STREAM BLOCK EXCHANGE

(71) Applicant: Western Digital Technologies, Inc., San Jose, CA (US)

(72) Inventor: Eldhose Peter, Bengaluru (IN)

(73) Assignee: Western Digital Technologies, Inc., San Jose, CA (US)

(*) Notice: Subject to any disclaimer, the term of this patent is extended or adjusted under 35 U.S.C. 154(b) by 162 days.

(21) Appl. No.: 16/773,314

(22) Filed: Jan. 27, 2020

(65) Prior Publication Data

US 2021/0232311 A1 Jul. 29, 2021

(51) Int. Cl.
*G06F 3/06* (2006.01)

(52) U.S. Cl.
CPC ............ *G06F 3/064* (2013.01); *G06F 3/0604* (2013.01); *G06F 3/0673* (2013.01)

(58) Field of Classification Search
CPC ...... G06F 3/064; G06F 3/0673; G06F 3/0604; G06F 3/0679; G06F 3/0616
See application file for complete search history.

(56) References Cited

U.S. PATENT DOCUMENTS

| | | | |
|---|---|---|---|
| 7,287,118 B2 | 10/2007 | Chang et al. | |
| 8,621,141 B2 | 12/2013 | Mudama et al. | |
| 10,228,862 B2 | 3/2019 | Liu et al. | |
| 10,282,324 B2 | 5/2019 | Bhimani et al. | |
| 2006/0149896 A1* | 7/2006 | Chang ................. | G06F 12/0246 711/103 |
| 2011/0246705 A1* | 10/2011 | Mudama ............ | G11C 16/3495 711/103 |
| 2014/0254231 A1* | 9/2014 | Cernea .................. | H01L 27/249 365/63 |
| 2017/0075832 A1* | 3/2017 | Bhimani ............... | G06F 3/0688 |
| 2017/0285967 A1 | 10/2017 | Panduransan et al. | |
| 2018/0267705 A1* | 9/2018 | Liu ........................ | G06F 3/0655 |
| 2019/0196713 A9 | 6/2019 | Yang et al. | |

* cited by examiner

*Primary Examiner* — Francisco A Grullon
(74) *Attorney, Agent, or Firm* — Crowell & Moring LLP (57) ABSTRACT

A storage system and method for maintaining uniform hot count distribution using smart stream block exchange are provided. In one embodiment, a rate at which a stream is requesting blocks from a plurality of blocks is determined, and a block from the plurality of blocks is selected for the stream based on the rate at which the stream is requesting blocks. Other embodiments are provided.

19 Claims, 11 Drawing Sheets

STORAGE SYSTEM AND METHOD FOR MAINTAINING UNIFORM HOT COUNT DISTRIBUTION USING SMART STREAM BLOCK EXCHANGE

BACKGROUND

Some storage systems use wear leveling techniques to extend the life of the system. For example, when choosing a block of a memory from a pool of available blocks, the storage system can be configured to choose a block having experienced the fewest number of program/erase cycles, which is referred to as the "coldest block." Over time, choosing the coldest block whenever a new block is needed helps ensure a uniform distribution of wear across many of the blocks in the storage system, thus extending the life of the storage system.

DETAILED DESCRIPTION

Overview

By way of introduction, the below embodiments relate to a storage system and method for maintaining uniform hot count distribution using smart stream block exchange. In one embodiment, a storage system is provided comprising a memory comprising a plurality of blocks including a first block and a second block, wherein a block cycling rate of the first block is greater than a block cycling rate of the second block; and a controller. The controller is configured to assign a block cycling rate of the plurality of blocks to a stream when a block is selected for the stream; prior to selecting another block for the stream, compare the block cycling rate assigned to the stream with a current block cycling rate of the plurality of blocks; in response to the block cycling rate assigned to the stream being less than the current block cycling rate of the plurality of blocks, select the first block for use by the stream; and in response to the block cycling rate assigned to the stream being greater than the current block cycling rate of the plurality of blocks, select the second block for use by the stream.

In some embodiments, the controller is further configured to assign the current block cycling rate of the plurality of blocks to the stream after the first or second block is selected.

In some embodiments, the block cycling rate of the plurality of blocks comprises a mean of block cycling rates of all blocks in the plurality of blocks.

In some embodiments, the first block is selected in response to the block cycling rate assigned to the stream being greater than the current block cycling rate of the plurality of blocks by a threshold.

In some embodiments, the second block is selected in response to the block cycling rate assigned to the stream being less than the current block cycling rate of the plurality of blocks by a threshold.

In some embodiments, the controller is further configured to process a plurality of streams, wherein at least one of the streams comprises sequential data, and wherein at least one other of the streams comprises random data.

In some embodiments, the memory comprises a three-dimensional memory.

In some embodiments, the storage system is configured to be integrated in a host.

In some embodiments, the storage system is configured to be removably connected with a host.

In another embodiment, a method is provided that is performed in a storage system comprising a memory comprising a plurality of blocks. The method comprises: (a) comparing a hot count assigned to a stream with a current hot count of the plurality of blocks; (b) in response to the hot count assigned to the stream being less than the current hot count of the plurality of blocks, forcing a block exchange for the stream to replace at least one of the blocks assigned to the stream with a block having a higher hot count than the stream; and (c) repeating (a)-(b) for at least one other stream.

In some embodiments, the hot count assigned to the stream comprises a hot count of the plurality of blocks a last time a block was assigned to the stream.

In some embodiments, the current hot count of the plurality of blocks comprises a mean of hot counts of all blocks in the plurality of blocks.

In some embodiments, the block exchange is forced in response to the hot count assigned to the stream being less than the current hot count of the plurality of blocks by a threshold.

In another embodiment, a storage system is provided comprising a memory comprising a plurality of blocks; means for determining a rate at which a stream is requesting blocks from the plurality of blocks; and means for selecting a block from the plurality of blocks for the stream based on the rate at which the stream is requesting blocks.

In some embodiments, the rate at which the stream is requesting blocks is determined by comparing a number of program/erase cycles assigned to the stream with a current number of program/erase cycles of the plurality of blocks.

In some embodiments, the number of program/erase cycles assigned to the stream comprises a number of program/erase cycles of the plurality of blocks a last time a block was selected for the stream.

In some embodiments, the number of program/erase cycles of the plurality of blocks comprises a mean of number of program/erase cycles of all blocks in the plurality of blocks.

In some embodiments, the plurality of blocks comprises a first block and a second block, wherein a number of program/erase cycles experienced by the first block is greater than a number of program/erase cycles experienced by the second block, and wherein the means for selecting selects the first block in response to a number of program/erase cycles experienced by the stream being less than a current number of program/erase cycles experienced by the plurality of blocks.

In some embodiments, the storage system further comprises means for assigning a current block cycling rate of the plurality of blocks to the stream after the first or second block is selected.

In some embodiments, the memory comprises a three-dimensional memory.

Other embodiments are possible, and each of the embodiments can be used alone or together in combination. Accordingly, various embodiments will now be described with reference to the attached drawings.

Embodiments

Figures 1A, 1B:
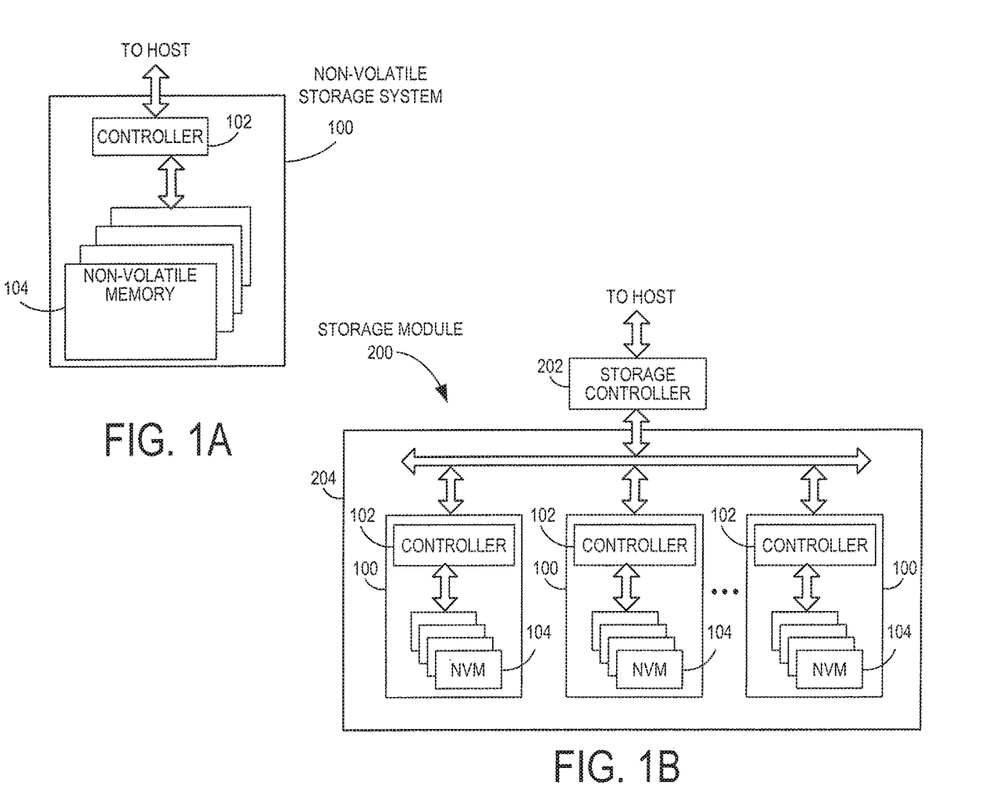
FIG. 1A is a block diagram of a non-volatile storage system of an embodiment.
FIG. 1B is a block diagram illustrating a storage module of an embodiment.
Figure 1C:
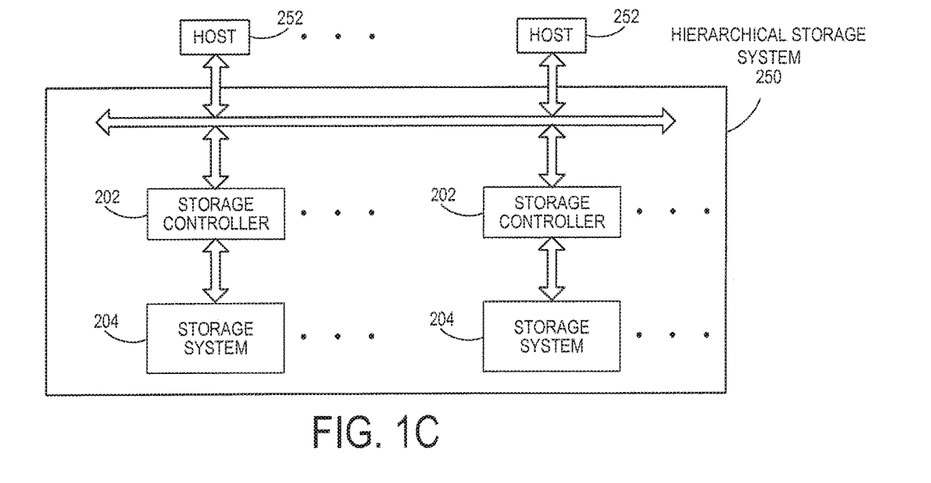
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a Microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e g. flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
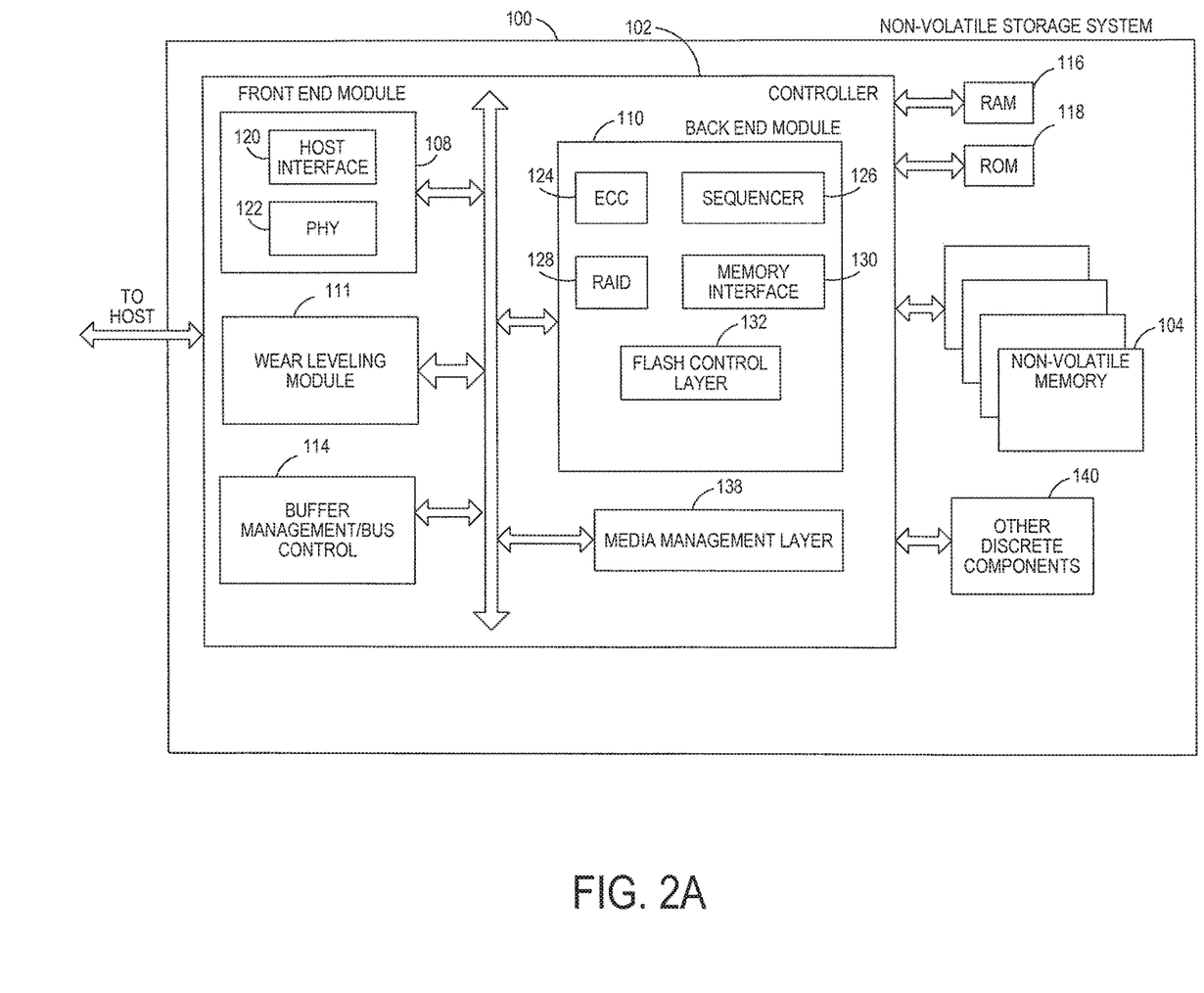
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a wear leveling module 111, which is discussed in more detail below, and can be implemented in hardware or software/firmware. The wear leveling module 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically; facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAM module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
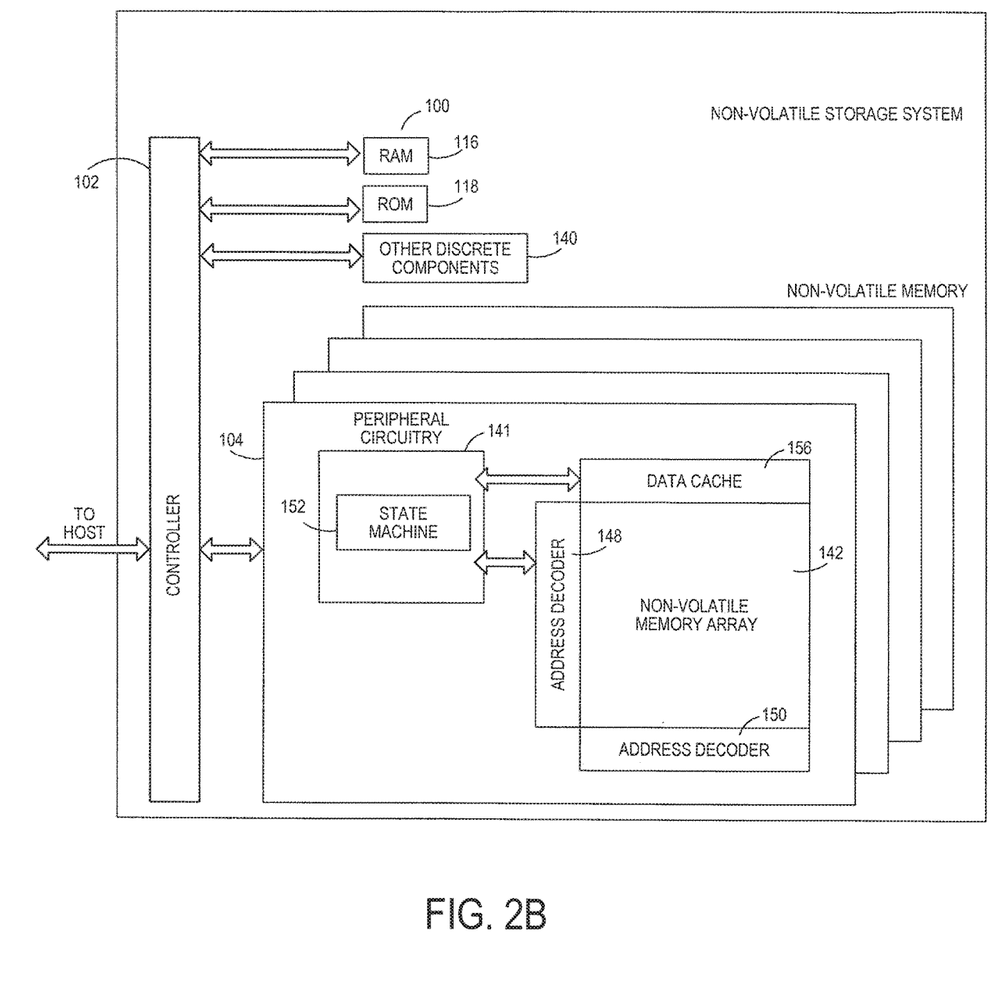
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTT, may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
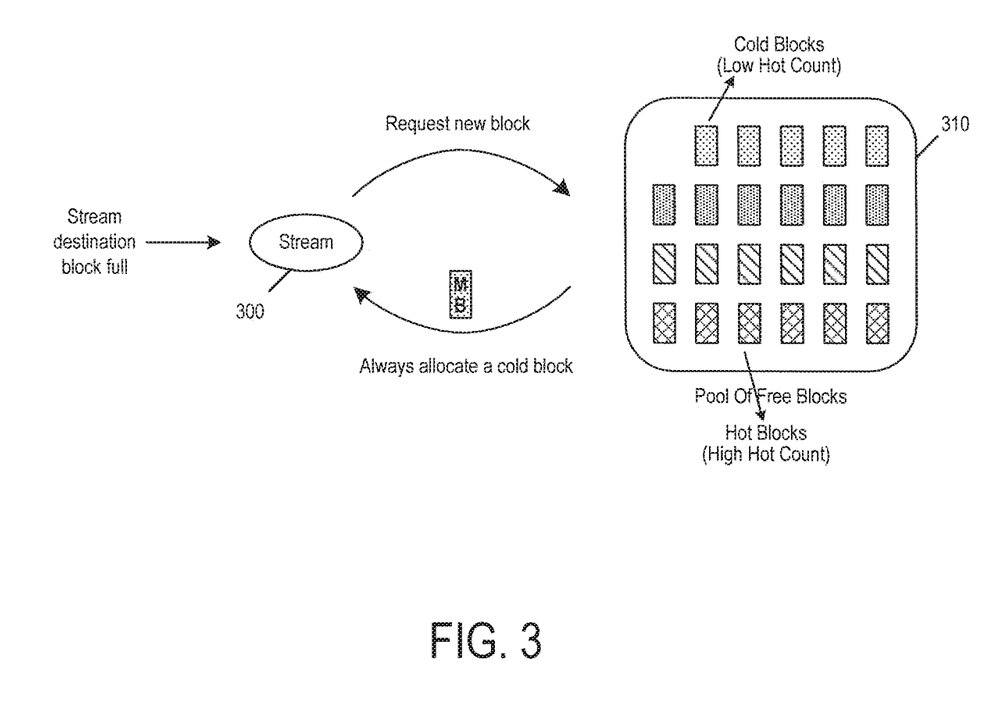
FIG. 3 is a block diagram of an embodiment in which a storage system always allocates the coldest block from a pool of free blocks.

As mentioned above, some storage systems use wear leveling techniques to extend the life of the system. For example, when choosing a block of a memory from a pool of available blocks, the storage system can be configured to choose a block having experienced the fewest number of program/erase cycles, which is referred to as the "coldest block." This is shown in FIG. 3 and is referred to herein as "passive wear levelling." As shown in FIG. 3, after a destination block is full of data from a stream 300, the storage system needs to allocate another block for the stream. (For simplicity, the term "block" will be used herein to refer to either a single block or a metablock (MB), which is a collection of several blocks.) In this embodiment, when the storage system requests a new block from a pool of free blocks 310, the storage system allocates the coldest block instead of a block that has experienced more program/erase cycles (a "hot block"). The phrase "hot count" will be used herein to refer to a value that is indicative of the amount of program/erase cycles a block has experience, with a hot block having a higher hot count than a cold block. Also, the phrase "block cycling rate" will be used herein to refer to the rate at which a given block experiences program/erase cycles.

Figure 4:
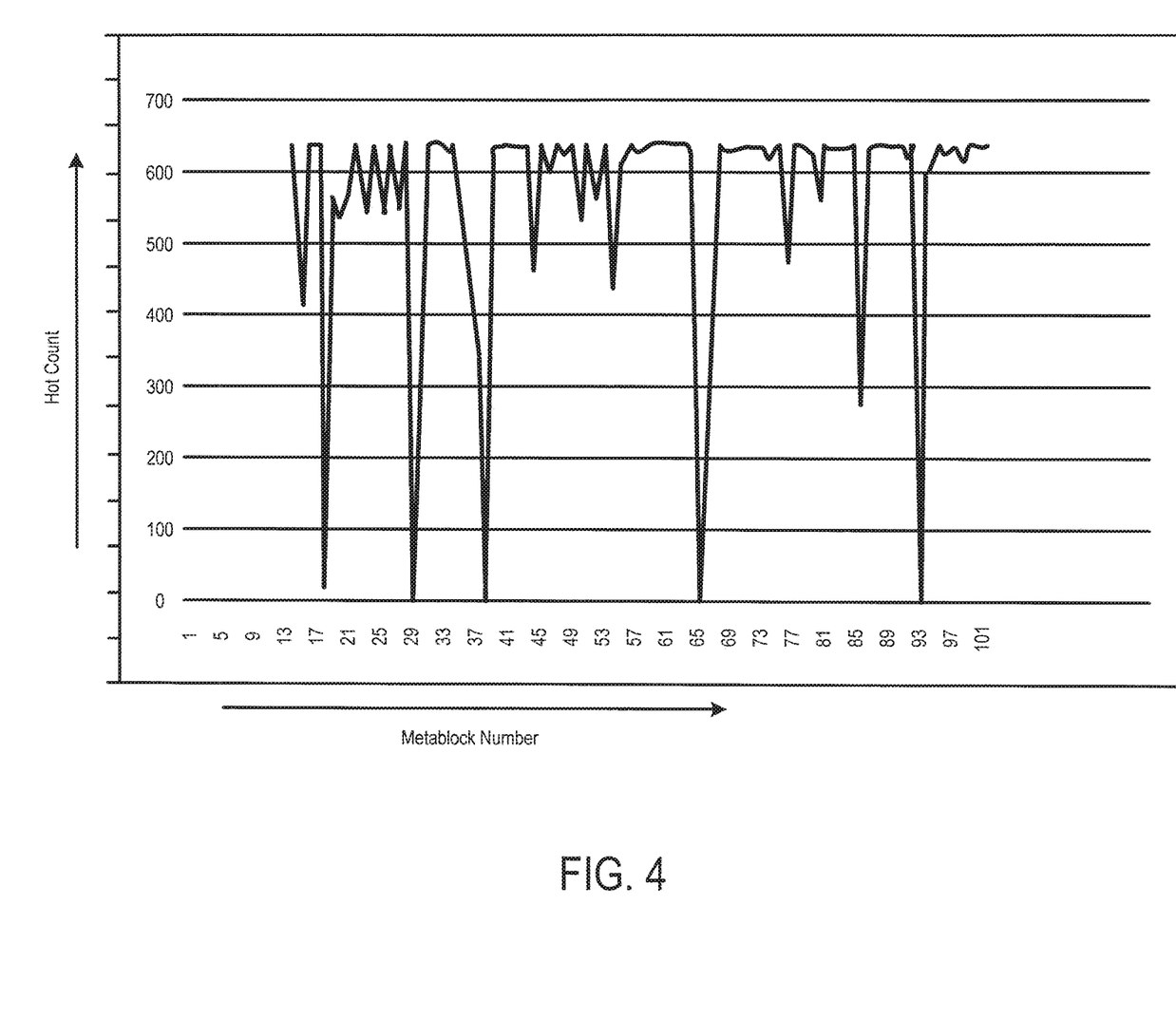
FIG. 4 is a graph of an embodiment showing hot count versus metablock number.

Choosing the coldest block whenever a new block is needed helps ensure a uniform distribution of wear ("uniform hot count distribution") over time across many of the blocks in the storage system, thus extending the life of the storage system. However, such a mechanism usually only operates on closed blocks, so while such a mechanism can help keep the average hot count within a limit, it is possible that the difference between the minimum and maximum hot count for individual blocks can be high. This is shown in the graph of FIG. 4, which is based on data for single-level cell (SLC) blocks in as solid-state drive running a data pattern for 72 hours. As can be seen from this graph, the hot count for a few of the blocks is much less than the maximum. After running the same pattern for four weeks, the difference between the minimum and maximum hot count is more than 1,000 even though the mean is close to the maximum hot count.

The reason for this difference between the minimum and maximum hot counts can be attributed to different run rates among multiple streams. Consider, for example, a situation in which the storage system is receiving multiple streams of data. In operation, the storage system attempts to determine if a given stream has sequential data or random data, so streams with the same data type can be written together. For any given strewn, when one block is filled, it is closed, and a new block is requested from the pool. Typically, random data is provided much less frequently to the storage system than sequential data, so the blocks used for sequential data will cycle much more quickly than blocks used for random data. So, by the time the block for random data is cycled once, the blocks for sequential may have been cycled many times, Referring back to FIG. 4, the blocks with the low hot count may be blocks used to store random data, whereas the blocks with the high hot count may be blocks used to store sequential data.

To elaborate on this, consider the situation where firmware in the storage system has multiple streams, Whenever a stream requires a block exchange, it will request a block manager to release a free block from the pool. Examples of commonly-used streams include, but are not limited to, a move in progress (MIP) stream, a group address table (GAT) block stream, one sequential stream, two or more sequential streams, a random stream, a single-level cell (SLC) compaction stream, and a multi-level cell (MLC) compaction stream. The rate at which blocks are cycled can be different with different stream (e.g., MIP and GAT streams may be less than a host stream). Within a host stream, the rate at which sequential streams get cycled compared to random streams can depend on the host pattern. Similarly, for a garbage collection stream, the rate can depend upon the host invalidation pattern.

Let's take an example of a storage system with a 2 GB SLC pool and a capacity of 480 GB. If a user is trying to copy 40 10-GB movies to this storage system, the storage system will get 400 GB of sequential data. This pattern will cycle all SLC blocks ~200 times. But the hot count of another stream's blocks may be 1 (e.g., if the storage system has not started SLC compaction or MLC compaction). If there are multiple other sequential streams, the hot count of those other sequential streams will also be 1. So, as illustrated by this example, a simple sequential pattern can create a difference of ~200 between the minimum and maximum hot count the system. And, as explained above, if the block manager of the system always searches for the coldest free block (lowest hot count) from the free pool to try to ensure a uniform wear levelling of blocks, this will have the effect of taking a cold block and making it colder, thereby increasing the minimum and maximum hot count difference and leading to higher write amplification.

Over time, this large difference between the minimum and maximum hot count of the system can have an impact on the life of the overall storage system. However, it typically is not a great concern if the mean is close to the maximum hot count of the system. However, this can be a concern if the storage system divides blocks into sub-blocks due to the unselected sub-block disturb (USBD) defect problem with sub-blocks. More specifically, some storage system can operate in a sub-block mode, allowing a physical block to be divided into two or more logical sub-blocks. That way, if there is a defect or problem with one of the sub-blocks, instead of discarding the entire block, the other sub-block(s) in the block can be used. However, when blocks are used in the sub-block mode, cycling of one sub-block can cause a disturbance for the data present in a sister sub-block. This is termed "unselected sub-block disturb." In some memory specifications, a sister sub block must be refreshed at least once within 1,000 cycles of its neighboring sub-block (in a possible stretch specification, within 4,000 cycles at end of life). During a refresh, all the valid data from the sister sub-block is relocated to a new block immediately as part of unselected sub-block disturb handling before cycling (erasing and re-writing) the selected sub-block again.

Figure 5:
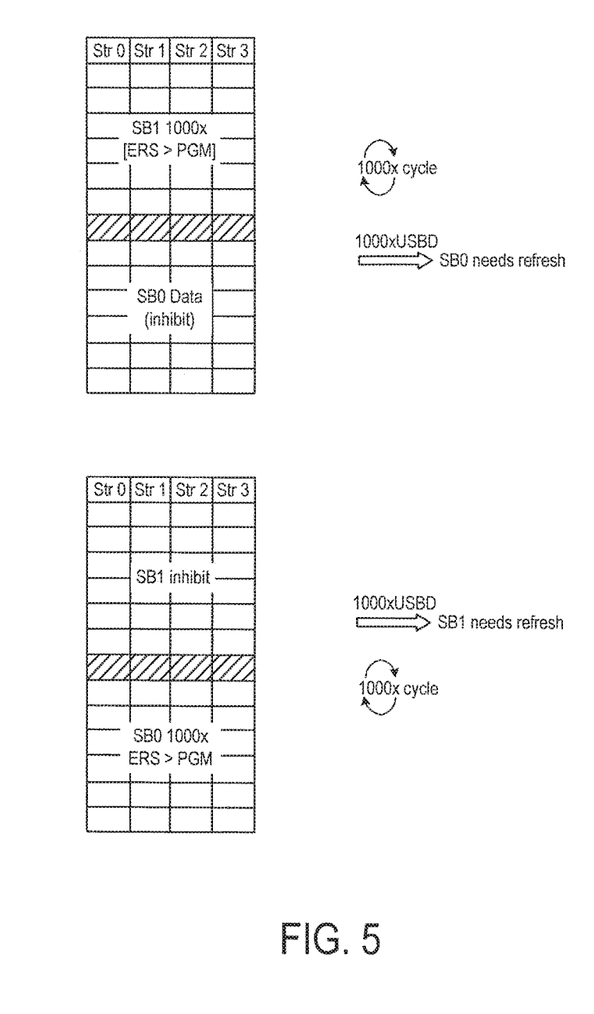
FIG. 5 is a block diagram of an embodiment illustrating a refresh process triggered by an unselected sub-block disturb problem.

FIG. 5 illustrates this process. FIG. 5 shows two sub-blocks of memory: SB1 and SB0 with several stripes (Str) of memory cells. As shown in FIG. 5, if sub-block SB0 has valid data and is not cycled within 1,000 cycles of sub-block SB1 (where the number of erases (ERS) is greater than the number of programs (PGM), the storage system performs at least one refresh of sub-block SB0 before cycling sub-block SB1 again. Similarly, if sub-block SB1 has valid data and is not cycled within 1,000 cycles of sub-block SB0, then sub-block SB1 needs at least one refresh before cycling sub-block SB0 again.

It is desired to avoid USBD handling in sub-block mode (e.g., by maintaining the difference between minimum and maximum hot count within 500). However, current wear leveling mechanisms are not designed for that purpose, as they only operate on closed blocks, search for 2 cold closed block with valid data, and if found, force a compaction. So, these mechanisms do not act on open blocks stuck with a slow stream, are only triggered when a higher hot count delta is formed in the system (so, they are not preventative), and are a very costly operation as they do not consolidate data and do not free space (instead, they move data from one block to another, thus increasing the write amplification of the system).

As an alternative to such active wear leveling, a storage system can use erase counters for each sub-block and force compaction when the sister sub-block is cycled more than 1,000 times. While the use of such counters can avoid USBD handling in sub-block mode, a new control page is needed to store the USBD counters. If each metablock requires four extra bytes to store this information for a single memory die, a storage system with multiple dies would require many extra bytes, as one sub-block can have multiple siblings during relinking. The use of counters also adds extra complexity of read, write, and caching operations of the new control pages. Further, updating the USBD counter and scheduling USBD compaction can be complex when relinking sub-blocks, as in each plane, there will be different sister sub-blocks. Additionally, like traditional wear leveling, USBD compaction can be very costly as it does not consolidate data and does not free space, but instead moves data from one block to another, thus increasing the write amplification of the system.

To provide a better alternative, instead of always selecting the coldest block for a stream, the following embodiments select a block based on the rate at which a stream is requesting blocks from a plurality of free blocks. If the stream is requesting blocks at a relatively high rate, the storage system 100 (e.g., the controller 102 or the wear leveling module 111) selects a block that is a relatively cold (has a relatively low hot count). In contrast, if stream is requesting blocks at a relatively slow rate, the storage system 100 selects a block that is relatively hot (has a relatively high hot count). The relative degree of the rate at which the stream is requesting blocks can be correlated with the relative hotness or coldness of the block selected (e.g., based on the stream's cycling rate, the storage system 100 can decide whether to select the coldest, cold, hot, or hottest block during the next block exchange).

Figure 6:
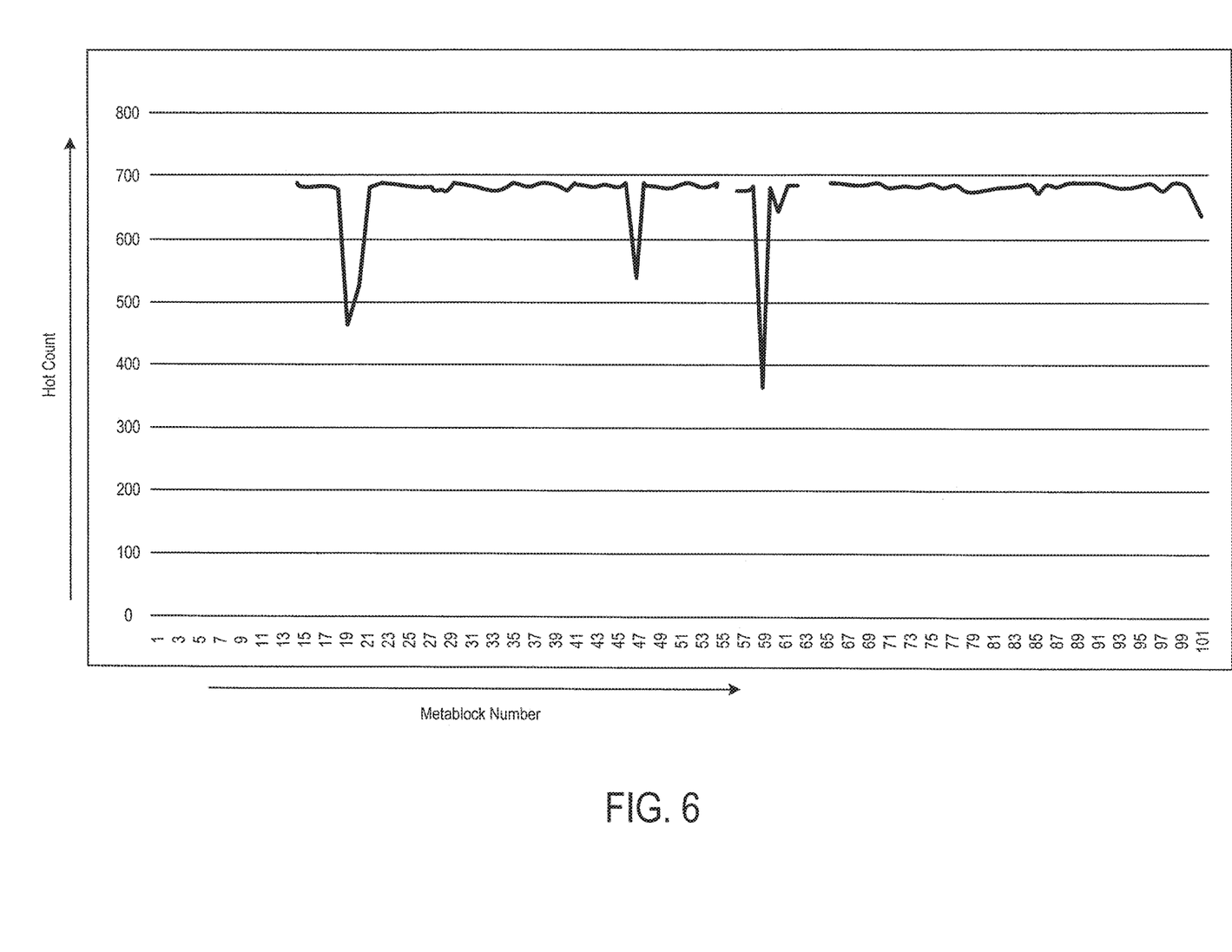
FIG. 6 is a graph of an embodiment showing hot count versus metablock. number.

As shown in the graph in FIG. 6 and as compared to the graph in FIG. 3, with this embodiment, the storage system 100 provides a better wear-level mechanism that if the coldest blocks are always selected. Accordingly, by detecting the rate at which each stream is getting cycled, the storage system 100 can maintain a uniform hot count delta between minimum and maximum. There are many other advantages associated with these embodiments. For example, these embodiments can be used to optimize wear leveling, as most of the wear levelling will happen passively through the stream itself This is very efficient as it will not increase the write implication, and no extra framework is involved. By providing stricter uniform wear leveling, these embodiments can increase the life of the storage system and can support higher cycling requirements with more reclaimed memory, thus providing a higher profit margin on the storage system 100 and reducing time to marker for reclaiming features. Further, with these embodiments, no extra handling is required for the USBD defect situation in sub-blocks.

This embodiment can be implemented in any suitable way. For example, in one implementation, the memory 104 of the storage system 100 comprises a plurality of free blocks including a first block and a second block. The block cycling rate of the first block is greater than the block cycling rate of the second block. To determine how fast a stream is consuming blocks, the controller 102 assigns a block cycling rate to the stream. In one embodiment, the block cycling rate assigned to the stream is the block cycling rate of the plurality of free blocks (e.g., the mean of the block cycling rates of all the individual blocks in the pool) when a block is selected for the stream.

Prior to selecting another block for the stream during block exchange, the controller 102 compares the block cycling rate assigned to the stream with a current block cycling rate of the plurality of free blocks. If the block cycling rate assigned to the stream is less than the current block cycling rate of the plurality of free blocks (e.g., by a threshold), that means the stream is consuming blocks slower than other streams (such as when the stream comprises random data and the other streams comprise sequential data). Assigning a cold block to this stream will make the problem worse, so, in that situation, the controller 102 selects a block that is relatively hotter than other blocks (so, in this example, the first block instead of the second block). After block selection, the stream's block cycling rate can be updated to the current block cycling rate of the plurality of blocks (i.e., the storage system 100 can "stamp" the system mean hot count to each stream after block exchange, so the next time the stream comes up for block exchange, the storage system 100 can detect its cycling rate with respect to the system cycling rate).

Figure 7:
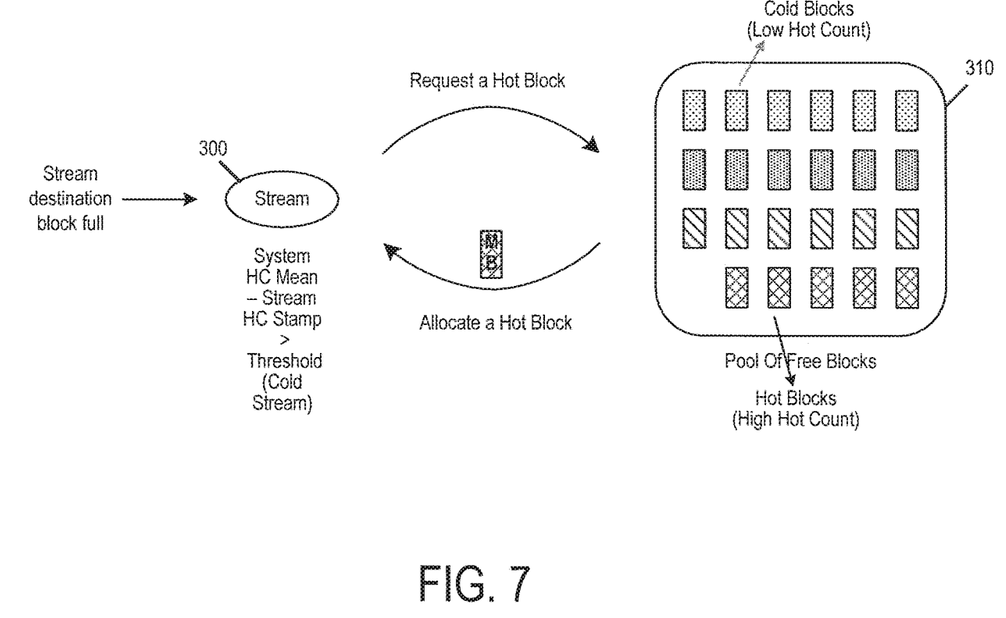
FIG. 7 is a block diagram that illustrates a method of an embodiment for allocating a memory block to a cold stream.

This is shown in FIG. 7. Here, the "System HC Mean" is the mean hot count of the hot counts of all the blocks in the pool of free blocks 310. The "Stream HC Stamp" is the hot count assigned to the stream, and the threshold represents a value (e.g., 10) that indicates a cold stream (i.e., the stream's cycling rate is slow compare to system's cycling rate). As shown in this example, when a stream goes for block exchange, the storage system 100 compares the stored system hot count with the current system hot count mean. If it is greater by a threshold (e.g., a different of 10), then the storage system 100 considers the stream to be a cold stream and requests a hot block. This helps in passively bringing down the hot count delta between minimum and maximum hot count.

Figure 8:
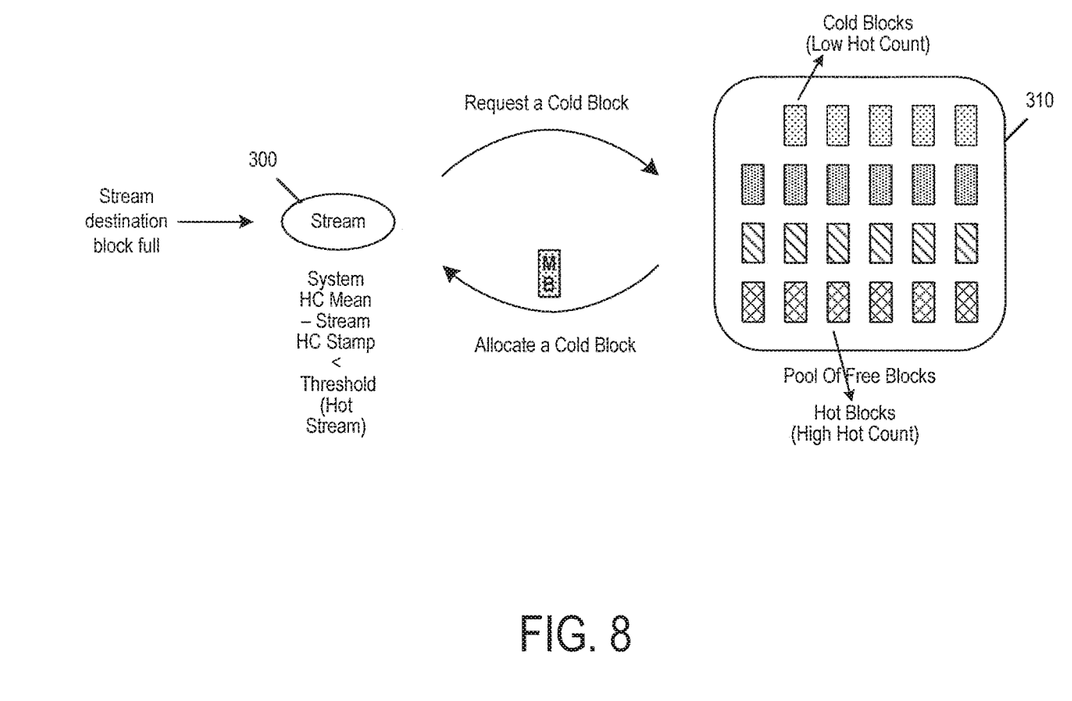
FIG. 8 is a block diagram that illustrates a method of an embodiment for allocating a memory block to a hot stream.

Likewise, if stream's block cycling rate is greater than the current block cycling rate of the plurality of free blocks (e.g., by a threshold), that means the stream is consuming blocks faster than other streams, and a colder block should be assigned. This is shown in FIG. 8. In this example, the stored system hot count is less than the current system hot count mean by a threshold (e.g., a different of 10). So, the storage system 100 considers the stream to be a hot stream and requests a cold block.

Figure 9:
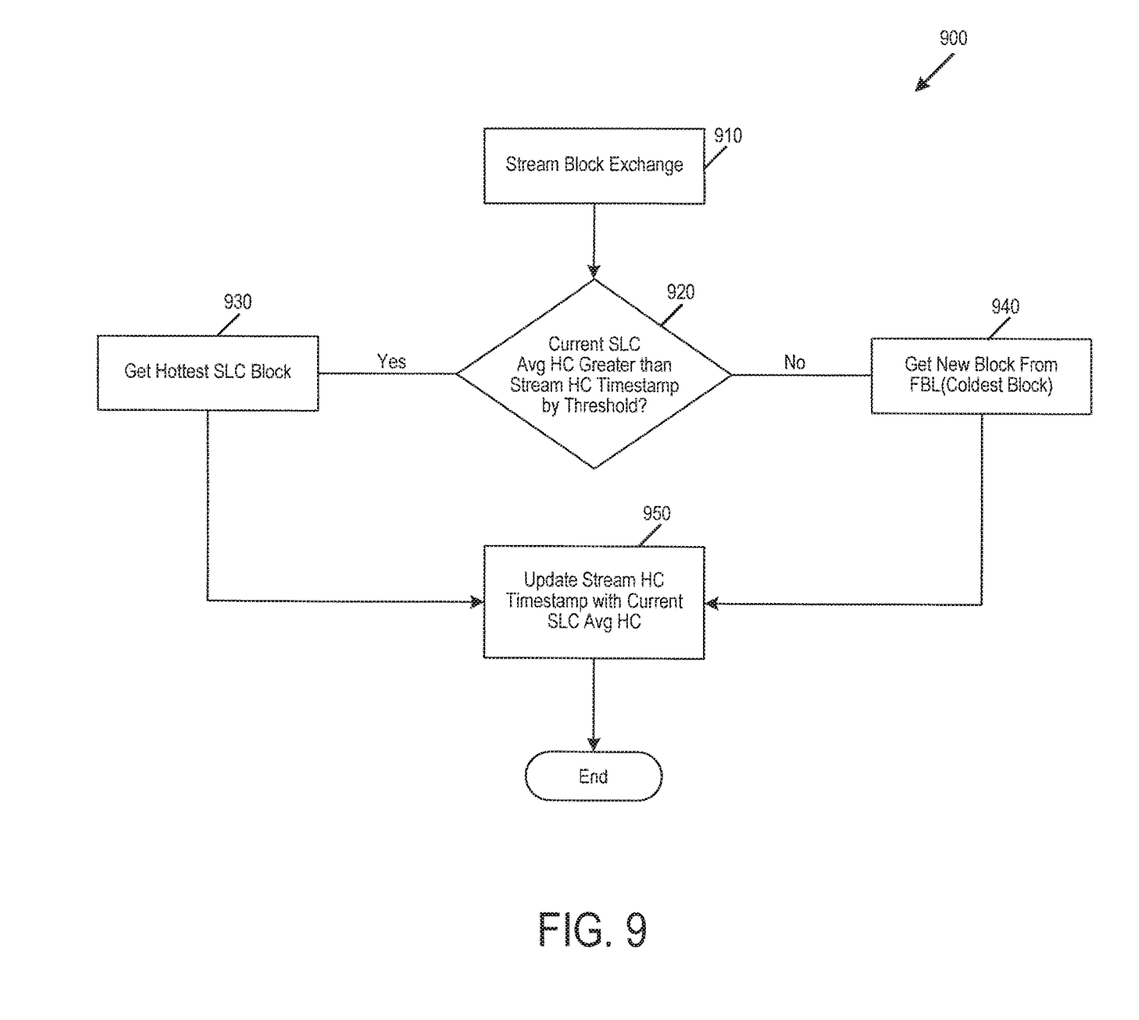
FIG. 9 is a flow chart of a method of an embodiment for selecting a block.

FIG. 9 is a flow chart 900 that also illustrates the example of this embodiment, in which the blocks in question are single-level cell (SLC) blocks. As shown in FIG. 9, during stream block exchange (910), a determination is made whether the current SLC average hot count is greater than the stream hot count timestamp by a threshold (920). If it is, the storage system 100 selects the hottest SLC block (930). If it is not, the storage system 100 selects a new (coldest) block from the free block (FBL) pool (940). Either way, the storage system updates the stream hot count timestamp with the current SLC average hot count (950).

Figure 10:
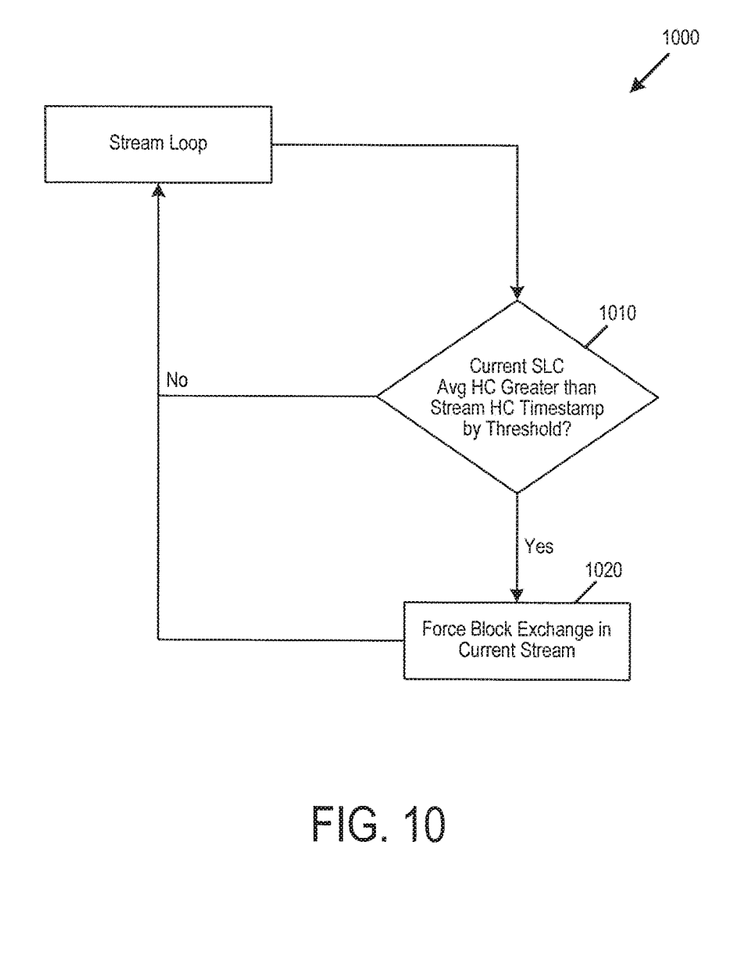
FIG. 10 is a flow chart of a method of an embodiment for looping through streams to force a block exchange.

There are many alternatives that can be used with these embodiments. For example, in situations in which there is no data being written for some of the streams, the passive method noted above may not get triggered, as new blocks are not being requested. The following embodiment can be used to provide an active method to force the block exchange for such streams. This active method can be trigger periodically for every increase in system hot count mean (e.g., by 10). FIG. 10 is a flow chart 1000 that illustrates this method of periodic scanning streams to force a very cold stream to release cold blocks. As shown in FIG. 10, the storage system 100 takes a stream and determines if the current SLC average hot count is greater than the stream hot count timestamp by a threshold (1010). If it not, the method loops to the next stream. If it is, the storage system 100 forces a block exchange in the current stream (1020). In this way, the storage system 100 loops through each stream, and if a given stream has a current SLC average hot count greater than the stream hot count timestamp (e.g., by a threshold), the storage system 100 can force a block exchange for that stream.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("ARAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level, Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system, comprising:
    a memory comprising a plurality of blocks including a first block and a second block, wherein a block cycling rate of the first block is greater than a block cycling rate of the second block; and
    a controller configured to communicate with the memory and to:
        assign a block cycling rate statistically representing block cycling rates of the plurality of blocks to a first stream when a block is selected for the first stream;
        prior to selecting another block for the first stream, compare the block cycling rate assigned to the first stream with a current block cycling rate statistically representing block cycling rates of the plurality of blocks, wherein the current block cycling rate is different from the block cycling rate assigned to the first stream because of use of the plurality of blocks by a second stream;
        in response to the block cycling rate assigned to the first stream being less than the current block cycling rate, which indicates that the first stream is consuming blocks slower than the second stream, select the first block for use by the first stream; and
        in response to the block cycling rate assigned to the first stream, being greater than the current block cycling rate, which indicates that the first stream is consuming blocks faster than the second stream, select the second block for use by the first stream.

2. The storage system of claim 1, wherein the controller is further configured to assign the current block cycling rate to the second stream.

3. The storage system of claim 1, wherein the block cycling rate comprises a mean of block cycling rates of all blocks in the plurality of blocks.

4. The storage system of claim 1, wherein the first block is selected in response to the block cycling rate assigned to the first stream being greater than the current block cycling rate by a threshold.

5. The storage system of claim 1, wherein the second block is selected in response to the block cycling rate assigned to the first stream being less than the current block cycling rate by a threshold.

6. The storage system of claim 1, wherein the controller is further configured to process a plurality of streams, wherein at least one of the streams comprises sequential data, and wherein at least one other of the streams comprises random data.

7. The storage system of claim 1, wherein the memory comprises a three-dimensional memory.

8. The storage system of claim 1, wherein the storage system is configured to be integrated in a host.

9. The storage system of claim 1, wherein the storage system is configured to be removably connected with a host.

10. In a storage system including a memory comprising a plurality of blocks including a first block and a second block, wherein a block cycling rate of the first block is greater than a block cycling rate of the second block, a method comprising:
    assigning a block cycling rate statistically representing block cycling rates of the plurality of blocks to a first stream when a block is selected for the first stream;
    prior to selecting another block for the first stream, comparing the block cycling rate assigned to the first stream with a current block cycling rate statistically representing block cycling rates of the plurality of blocks, wherein the current block cycling rate is different from the block cycling rate assigned to the first stream because of use of the plurality of blocks by a second stream;
    in response to the block cycling rate assigned to the first stream being less than the current block cycling rate, which indicates that the first stream is consuming blocks slower than the second stream, selecting the first block for use by the first stream; and
    in response to the block cycling rate assigned to the first stream being greater than the current block cycling rate, which indicates that the first stream is consuming blocks faster than the second stream, selecting the second block for use by the first stream.

11. The method of claim 10, further comprising assigning the current block cycling rate to the second stream.

12. The method of claim 10, wherein the block cycling rate comprises a mean of block cycling rates of all blocks in the plurality of blocks.

13. The method of claim 10, wherein the first block is selected in response to the block cycling rate being greater than the current block cycling rate by a threshold.

14. The method of claim 10, wherein the second block is selected in response to the block cycling rate assigned to the stream being less than the current block cycling rate by a threshold.

15. The method of claim 10, further comprising processing a plurality of streams, wherein at least one of the streams comprises sequential data, and wherein at least one other of the streams comprises random data.

16. The method of claim 10, wherein the memory comprises a three-dimensional memory.

17. The method of claim 10, wherein the storage system configured to be integrated in a host.

18. The method of claim 10, wherein the storage system is configured to be removably connected with a host.

19. A storage system, comprising:
    a memory comprising a plurality of blocks including a first block and a second block, wherein a block cycling rate of the first block is greater than a block cycling rate of the second block;
    means for assigning a block cycling rate statistically representing block cycling rates of the plurality of blocks to a first stream when a block is selected for the first stream;
    means for prior to selecting another block for the first stream, comparing the block cycling rate assigned to the first stream with a current block cycling rate statistically representing block cycling rates of the plurality of blocks, wherein the current block cycling rate is different from the block cycling rate assigned to the first stream because of use of the plurality of blocks by a second stream;
    means for in response to the block cycling rate assigned to the first stream being less than the current block cycling rate, which indicates that the first stream is consuming blocks slower than the second stream, selecting the first block for use by the first stream; and means for in response to the block cycling rate assigned to the first stream being greater than the current block cycling rate, which indicates that the first stream is consuming blocks faster than the second stream, selecting the second block for use by the first stream.

\* \* \* \* \*